US012795362B2

(12) United States Patent
Tsai et al.

(10) Patent No.: US 12,795,362 B2
(45) Date of Patent: Nov. 10, 2026

(54) METHOD AND SYSTEM FOR RESUMING CONNECTION, AND COMPUTER READABLE STORAGE MEDIUM

(71) Applicant: HTC Corporation, Taoyuan City (TW)

(72) Inventors: Yao-Te Tsai, Taoyuan City (TW); Chun-Hao Fan, Taoyuan City (TW); Wei-Shen Ou, Taoyuan City (TW); Zhong Zhen Wu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 172 days.

(21) Appl. No.: 18/796,241

(22) Filed: Aug. 6, 2024

(65) Prior Publication Data

US 2025/0220424 A1 Jul. 3, 2025

Related U.S. Application Data

(60) Provisional application No. 63/615,797, filed on Dec. 29, 2023.

(51) Int. Cl.
*H04W 12/069* (2021.01)
*H04W 76/11* (2018.01)

(52) U.S. Cl.
CPC .......... *H04W 12/069* (2021.01); *H04W 76/11* (2018.02)

(58) Field of Classification Search
CPC ............................ H04W 12/069; H04W 76/11
See application file for complete search history.

(56) References Cited

U.S. PATENT DOCUMENTS 8,649,768 B1 * 2/2014 Gaddam ................. H04M 3/38 455/414.1
9,942,937 B1 * 4/2018 Siedelhofer ........... H04W 76/19
(Continued)

FOREIGN PATENT DOCUMENTS

CN 115883233 3/2023
TW 201250620 12/2012
(Continued)

OTHER PUBLICATIONS

"Office Action of Taiwan Counterpart Application", issued on Feb. 12, 2025, p. 1-p. 8.
(Continued)

*Primary Examiner* — Jason Chiang
(74) *Attorney, Agent, or Firm* — JCIPRNET

(57) ABSTRACT

The embodiments of the disclosure provide a method and system for resuming a connection, and a computer readable storage medium. The method includes: establishing a first connection with a host and sending first identification information associated with the first client device to the host via the first connection; determining first certification information based on the first identification information and sending the first certification information to the first client device via the first connection; in response to determining that a first connection resume operation associated with the first connection is triggered in a case where the first connection is disconnected, at least sending the first certification information to the host; certifying the first client device at least based on the first certification information and first reference information; and in response to determining that the first client device is certified, resuming the first connection with the first client device.

14 Claims, 5 Drawing Sheets

(56) References Cited

U.S. PATENT DOCUMENTS

| | | | |
|---|---|---|---|
| 11,368,994 B1 | 6/2022 | Robinson et al. | |
| 2001/0052075 A1* | 12/2001 | Feinberg | G06F 21/445 713/168 |
| 2002/0147645 A1* | 10/2002 | Alao | H04N 21/25875 705/14.69 |
| 2003/0028649 A1* | 2/2003 | Uhlik | H04L 67/14 709/228 |
| 2006/0117106 A1* | 6/2006 | Abdo | H04L 63/126 709/227 |
| 2008/0165024 A1* | 7/2008 | Gretton | G01C 21/3655 340/4.31 |
| 2010/0042413 A1* | 2/2010 | Simpson | G10L 15/30 704/E15.001 |
| 2010/0146275 A1* | 6/2010 | Slick | H04L 9/3215 713/169 |
| 2013/0142182 A1* | 6/2013 | Gundavelli | H04W 8/02 370/338 |
| 2013/0185444 A1 | 7/2013 | Meenan et al. | |
| 2013/0227288 A1* | 8/2013 | Konrad | H04L 9/3297 713/168 |
| 2014/0365199 A1* | 12/2014 | Mosterman | G06F 13/107 703/20 |
| 2015/0201455 A1* | 7/2015 | Redding | H04W 4/80 455/41.2 |
| 2015/0365272 A1* | 12/2015 | Takasu | H04L 67/146 709/223 |
| 2016/0063263 A1* | 3/2016 | Lee | G06F 21/79 726/26 |
| 2016/0278160 A1* | 9/2016 | Schliwa-Bertling | H04W 76/27 |
| 2017/0085381 A1* | 3/2017 | Richardson | H04L 9/0866 |
| 2017/0171187 A1* | 6/2017 | Yin | H04L 63/083 |
| 2017/0221055 A1* | 8/2017 | Carlsson | G06Q 20/40 |
| 2017/0289268 A1* | 10/2017 | Behunin | H04L 67/142 |
| 2018/0281560 A1* | 10/2018 | Dearth | B60H 1/00978 |
| 2019/0372792 A1* | 12/2019 | Wang | H04L 43/10 |
| 2020/0112555 A1* | 4/2020 | Brown | H04L 63/083 |
| 2020/0162517 A1* | 5/2020 | Wong | H04W 12/08 |
| 2020/0280932 A1* | 9/2020 | Down | H04W 52/283 |
| 2021/0211867 A1* | 7/2021 | Amorde | H04W 12/03 |
| 2022/0038909 A1* | 2/2022 | Mendelowitz | H04W 76/10 |
| 2022/0104102 A1* | 3/2022 | Amar | H04W 76/19 |
| 2022/0132615 A1* | 4/2022 | Sharma | H04W 48/20 |
| 2023/0022160 A1* | 1/2023 | Koskinen | H04W 76/20 |
| 2023/0262813 A1* | 8/2023 | Wang | H04W 76/19 370/328 |
| 2023/0276513 A1* | 8/2023 | Sheth | H04W 12/084 455/41.2 |
| 2024/0121609 A1* | 4/2024 | Neipris | H04W 12/069 |
| 2024/0172315 A1* | 5/2024 | Balachandran | H04W 48/18 |
| 2025/0039960 A1* | 1/2025 | Thomas | H04W 76/14 |
| 2025/0056641 A1* | 2/2025 | Emeott | H04W 12/068 |
| 2025/0081138 A1* | 3/2025 | Lee | H04W 12/75 |

FOREIGN PATENT DOCUMENTS

| | | |
|---|---|---|
| TW | 202105221 | 2/2021 |
| WO | 2023083691 | 5/2023 |

OTHER PUBLICATIONS

"Search Report of Europe Counterpart Application", issued on Feb. 27, 2025, p. 1-p. 5.

* cited by examiner

METHOD AND SYSTEM FOR RESUMING CONNECTION, AND COMPUTER READABLE STORAGE MEDIUM

CROSS-REFERENCE TO RELATED APPLICATION

This application claims the priority benefit of U.S. provisional patent application Ser. No. 63/615,797, filed on Dec. 29, 2023. The entirety of the above-mentioned patent application is hereby incorporated by reference herein and made a part of this specification.

BACKGROUND

1. Field of the Invention

The present disclosure generally relates to a communication mechanism, in particular, to a method and system for resuming a connection, and a computer readable storage medium.

2. Description of Related Art

In existing connection technologies such as Wi-Fi and Bluetooth, the pairing and connection process between devices typically involves cumbersome pairing and authentication steps. When the connection between these devices is interrupted, re-establishing the connection often takes considerable time, affecting the user experience.

See FIG. 1, which shows a conventional flow of establishing a connection between devices. In FIG. 1, it is assumed that the host 100 supports 2 devices, such as Client 1 and Client 2, and the host 100 can be paired with Client 1 and Client 2 based on, for example, the Bluetooth protocol.

As shown in FIG. 1, the process 199 of the Bluetooth protocol for establishing a connection between each of the Client 1 and Client 2 may involve the steps 1991-1996. That is, when the host 100 is establishing a connection between the Client 1, the steps 1991-1996 need to be performed between the host 100 and the Client 1. Likewise, the steps 1991-1996 need to be performed between the host 100 and the Client 2 for establishing a connection between the host 100 and the Client 2.

In addition, after step 1996, the host 100 may further ask the connected client that which kind of profile does the connected client supports. For example, after the host 100 establishes the connection with Client 1 after performing steps 1991-1996, the host 100 may further ask Client 1 to provide the supported profiles of Client 1, wherein the profiles may include, for example, Human Interface Device (HID) Profile, the heart rate profile, etc.

However, if any of the connections is disconnected and needs to be resumed/recovered, at least steps 1994-1996 of the steps 1991-1996 need to be performed again, which may be time consuming.

For example, assuming that the Client 1 is shut down during the connection with the host 100, such that the connection between the host 100 and the Client 2 needs to be accordingly resumed, the host 100 and the Client 2 need to perform steps 1994-1996 to resume the connection therebetween, even if the host 100 and the Client 2 had performed steps 1991-1996 in the past. For another example, if the sever 100 needs to be switched from connecting with the Client 1 to be connection with the currently disconnected Client 2, the host 100 and the Client 2 need to perform steps

1994-1996 to resume the connection therebetween, even if the host 100 and the Client 2 had performed steps 1991-1996 in the past.

Based on the specification of the Bluetooth protocol, the process for resuming the above connection may take about one second to finish, which may be not time efficient, and the same problem also exists in other protocols (e.g., Wifi).

Therefore, finding a solution to expedite the connection resuming process between devices has become an urgent problem to address.

SUMMARY OF THE INVENTION

Accordingly, the disclosure is directed to a method and system for resuming a connection, and a computer readable storage medium, which may be used to solve the above technical problems.

The embodiments of the disclosure provide a method for resuming a connection, including: establishing, by a first client device, a first connection with a host and sending, by the first client device, first identification information associated with the first client device to the host via the first connection; determining, by the host, first certification information based on the first identification information and sending, by the host, the first certification information to the first client device via the first connection, wherein the first certification information is stored by the host as a first reference information; in response to determining that a first connection resume operation associated with the first connection is triggered in a case where the first connection is disconnected, at least sending, by the first client device, the first certification information to the host; certifying, by the host, the first client device at least based on the first certification information and the first reference information; and in response to determining that the first client device is certified, resuming, by the host, the first connection with the first client device.

The embodiments of the disclosure provide a system for resuming a connection, including a first client device and a host. The first client device establishes a first connection with a host and sending first identification information associated with the first client device to the host via the first connection. The host determines first certification information based on the first identification information and sending the first certification information to the first client device via the first connection, wherein the first certification information is stored by the host as a first reference information. In response to determining that a first connection resume operation associated with the first connection is triggered in a case where the first connection is disconnected, the first client device at least sends the first certification information to the host. The host certifies the first client device at least based on the first certification information and the first reference information; and in response to determining that the first client device is certified, the host resumes the first connection with the first client device.

The embodiments of the disclosure provide a computer readable storage medium, the computer readable storage medium recording an executable computer program, the executable computer program being loaded by a host and a first client device to perform steps of: establishing, by the first client device, a first connection with the host and sending, by the first client device, first identification information associated with the first client device to the host via the first connection; determining, by the host, first certification information based on the first identification information and sending, by the host, the first certification information to the first client device via the first connection, wherein the first certification information is stored by the host as a first reference information; in response to determining that a first connection resume operation associated with the first connection is triggered in a case where the first connection is disconnected, at least sending, by the first client device, the first certification information to the host; certifying, by the host, the first client device at least based on the first certification information and the first reference information; and in response to determining that the first client device is certified, resuming, by the host, the first connection with the first client device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
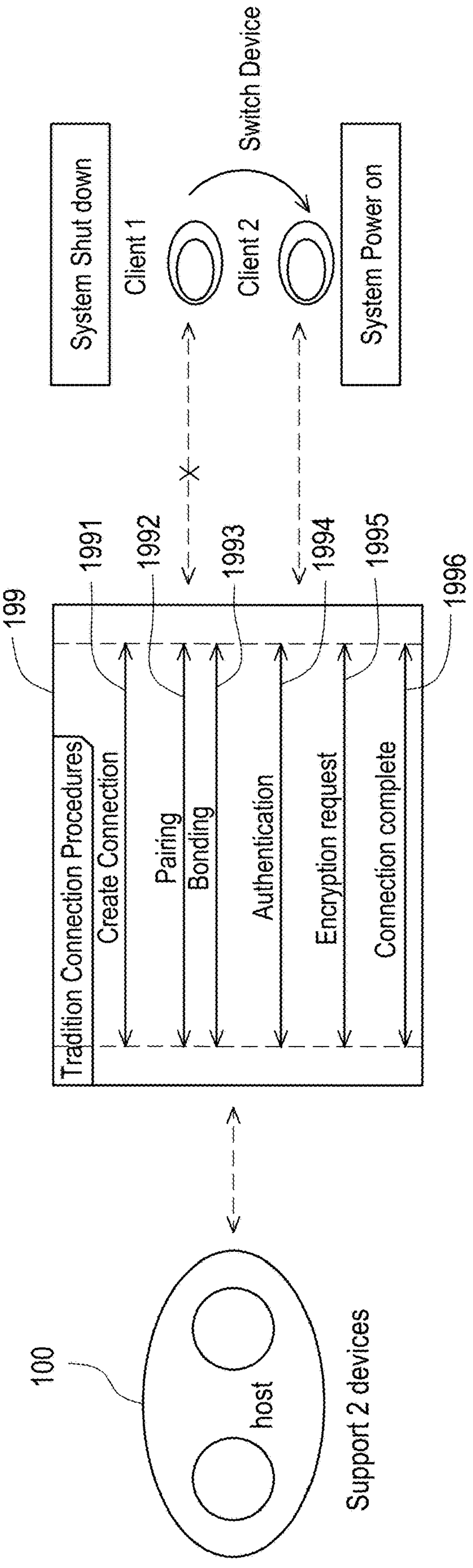
FIG. 1 (PRIOR ART)
FIG. 1 shows a conventional flow of establishing a connection between devices.

Reference will now be made in detail to the present preferred embodiments of the invention, examples of which are illustrated in the accompanying drawings. Wherever possible, the same reference numbers are used in the drawings and the description to refer to the same or like parts.

Figure 2:
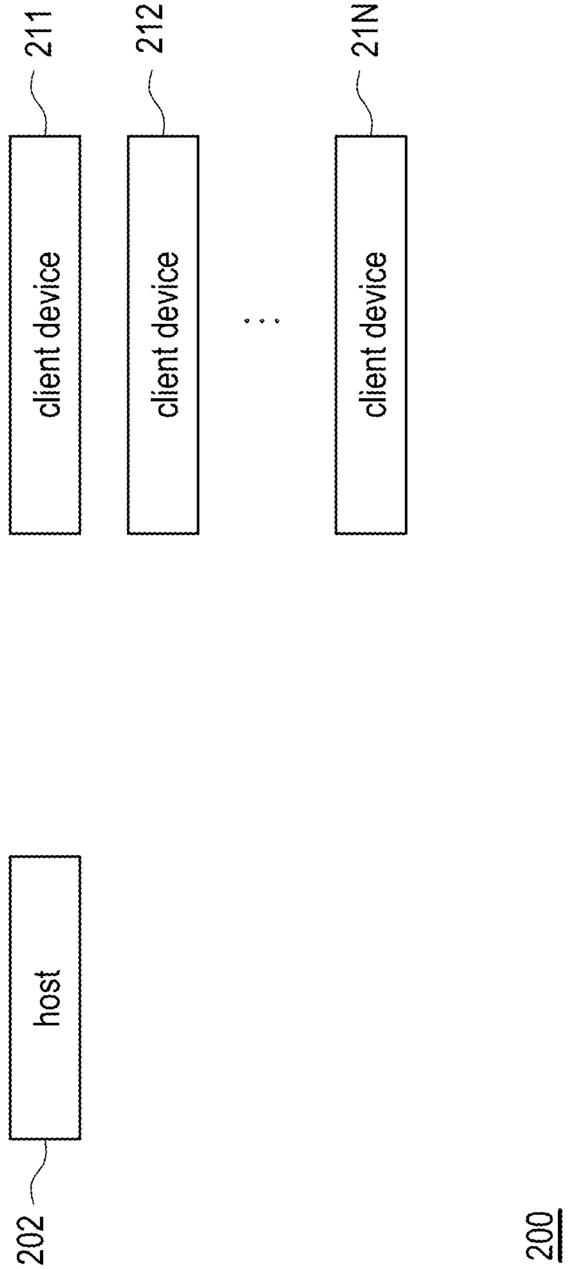
FIG. 2 shows a schematic diagram of the system for resuming a connection according to an embodiment of the disclosure.

See FIG. 2, which shows a schematic diagram of the system for resuming a connection according to an embodiment of the disclosure.

In FIG. 2, the system 200 may include the host 202 and the client devices 211-21N (N is a positive integer). In some embodiments, the host 202 may be any smart device and/or computer devices. In one embodiment, the host 202 may be a server that manages the client devices 211-21N.

In one embodiment, the one or more client devices may be, for example, peripheral devices (e.g., handheld controllers and/or wearable devices) of the host 202.

In one embodiment, the host 202 may be a head-mounted display (HMD) that can be used to provide/show the visual content of one or more reality services to the wearer/user thereof. The reality services may include the virtual reality (VR) service, the augmented reality (AR) service, the mixed reality (MR) service, and/or the extended reality (XR) service, etc.

In the embodiments where the host 202 can provide/show the visual contents of the corresponding reality services, the client device(s) managed by the host 202 may be used by the user for interacting with the visual contents (e.g., the VR world), but the disclosure is not limited thereto.

In some embodiments, one or more of the client device 211-21N may be connected/disconnected with the host 202 from time to time based on the usage scenario of the user. For example, the user may need to use the client device 211 to interact with the VR world at a first location, and hence the host 202 may need to be connected with the client device 211 during the user being at the first location. However, the user may move to another location (referred to as a second location) during immersing in the same VR world, such that the user may need to be changed to use the client device 212 to interact with the VR world. In this case, the host 202 may need to switch from being connecting to the client device 211 to connecting with the client device 212, but the disclosure is not limited thereto.

However, as mentioned in the above, even if the client device 212 had established a connection before, the host 202 and the client device 212 still need to re-perform (at least a part) of the connection establishment process (e.g., steps 1994-1996) to resume the connection therebetween, which is time consuming.

Accordingly, the embodiments of the disclosure provide a method for resuming a connection, which may be used to resolve this problem.

Figure 3:
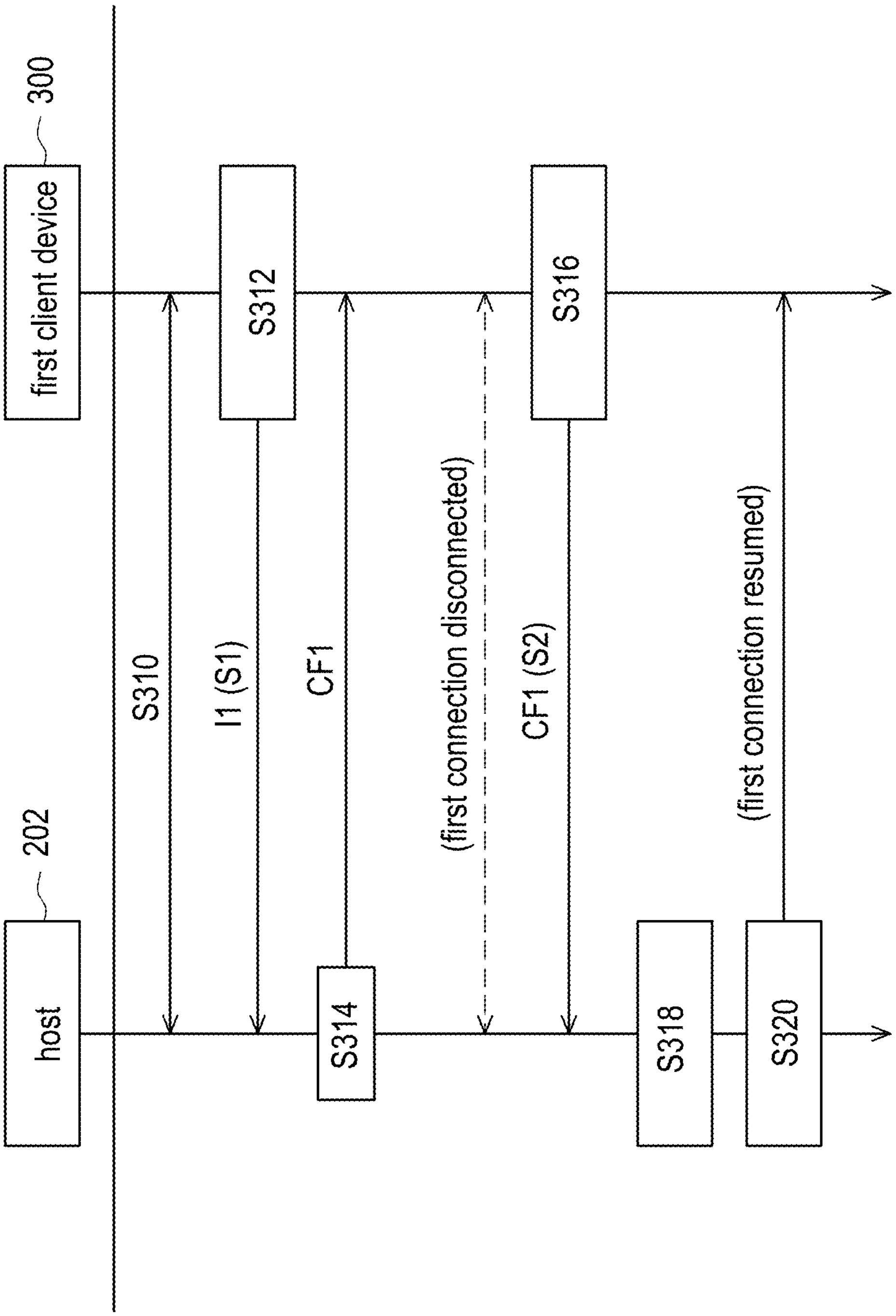
FIG. 3 shows a flow chart of the method for resuming a connection according to an embodiment of the disclosure.

See FIG. 3, which shows a flow chart of the method for resuming a connection according to an embodiment of the disclosure. In the embodiment, the method may be executed by the host 202 in FIG. 1 and a first client device 300 (which may be any of the client devices 211-21N), and the details of each step in FIG. 3 will be described below with the components shown in FIG. 1.

In step S310, the first client device 300 establishes a first connection with the host 202.

In one embodiment, the first client device 300 and the host 202 may establish the first connection therebetween by following the specification of the used communication protocol. For example, if the Bluetooth protocol is used as the communication protocol between the host 202 and the first client device 300, the host 202 and the first client device 300 may collaboratively perform steps 1991-1996 in FIG. 1, such that the first connection in step S310 can be established. In the embodiments where other communication protocols are used between the host 202 and the first client device 300, the process of establishing the first connection may be referred to the corresponding specification, but the disclosure is not limited thereto.

In one embodiment, after the first connection has been established between the host 202 and the first client device 300, the first client device 300 performs step S312 to send first identification information I1 to the host 202 via the first connection (e.g., a Bluetooth connection).

In various embodiments, the first identification information I1 may be any information that characterizes the identification of the first client device 300. For example, the first identification information I1 may be the universally unique identifier (UUID) of the first client device 300, the address (e.g., the medium access control (MAC) address) of the first client device 300, but the disclosure is not limited thereto.

In other embodiments, the first identification information I1 may be other information obtained by performing a particular procedure (e.g., encryption and/or disguise) to the identification of the UUID and/or MAC address of the first client device 300, but the disclosure is not limited thereto.

In one embodiment, the first client device 300 may further send a first scenario state S1 associated with the first client device 300 to the host 202 via the first connection.

In some embodiments, the first scenario state S1 may include the information associated with the usage scenario corresponding to the first client device 300, such as the location/environment/duration where the first client device 300 is deployed to be used, but the disclosure is not limited thereto.

For example, assuming that the first client device 300 is the client device 211 used by the user at the first location to interact with the VR world, the first scenario state S1 may include the information of, for example, the first location, such as the geographical coordinates and the associated regions, but the disclosure is not limited thereto.

In step S314, the host 202 determines first certification information CF1 based on the first identification information I1 and sends the first certification information CF1 to the first client device 300 via the first connection.

In one embodiment, the host 202 may retrieve a first text segment from the first certification information I1 as the first certification information CF1. Specifically, the host 202 may divide the first identification information I1 into at least one text segment and use one of the text segment(s) as the first text segment.

For example, the host 202 may divide the first certification information I1 into text segments A, B, C, and use the text segment A, B, or C as the first text segment. Next, the host 202 may send the first text segment (e.g., the text segment A) as the first certification information CF1 to the first client device 300, but the disclosure is not limited thereto.

In various embodiments, the principle of the host 202 dividing the first certification information I1 into text segments may be determined based on the requirements of the designer.

In another embodiment, after the host 202 determines the first text segment, the host 202 may further convert the first text segment into the first certification information CF1 by using a converting function.

That is, instead of directly using the first text segment as the first certification information CF1, the host 202 may firstly use the converting function to convert the first text segment and use the converted result as the first certification information CF1, but the disclosure is not limited thereto.

In various embodiments, the converting function may be determined based on the requirements of the designer.

In the embodiments of the disclosure, the first certification information CF1 is stored by the host 202 as a first reference information, which may be used as a basis for certifying the first client device 300 when the first client device 300 requests to resume the first connection.

In the embodiments of the disclosure, the first connection may be disconnected for some reasons, such as the host 202 has been moved away to be far from the first client device 300, and/or the host 202 has been switched to be connected with other client devices.

In one embodiment, when the first client device 300 is switched from the active mode (in which the radio function of the first client device 300 is activated) to the standby mode (in which the radio function of the first client device 300 is deactivated/suspended), the first connection may also be considered as being disconnected. That is, in response to determining that the radio function of the first client device 300 is suspended, the first client device 300 may determine that the first connection is disconnected, but the disclosure is not limited thereto.

In some embodiments, the first client device 300 may determine whether a first connection resume operation associated with the first connection is triggered in a case where the first connection is disconnected.

In one embodiment, in response to determining that the host 202 is switched from connecting with a second client device to connect with the first client device 300 in the case where the first connection is disconnected, the first client device 300 may determine that the first connection resume operation associated with the first connection is triggered.

For example, if the first client device 300 and the second client device are the client device 211 and the client device 212 respectively at the first and second location, the host 202 may be switched from connecting with the second client device to connect with the first client device 300 after moving from the second location to the first location, but the disclosure is not limited thereto. In this case, the first client device 300 may determine that the first connection resume operation associated with the first connection is triggered.

In one embodiment, in response to determining that the radio function of the first client device 300 is resumed, the first client device 300 may determine that the first connection resume operation associated with the first connection is triggered.

In one embodiment, when the first client device 300 has been unused for a while, the first client device 300 may enter the standby mode where the radio function may be deactivated. In this case, the first client device 300 may detect whether the first client device 300 is being used again. If yes, the first client device 300 may switch to the active mode where the radio function is activated.

For example, the first client device 300 may be disposed with a motion detection circuit (e.g., an inertia measurement unit (IMU)) that outputs the motion data associated with the movement of the first client device 300. If the motion data indicates that the first client device 300 has been moved, the first client device 300 may determine that the first client device 300 is being used again and accordingly determine that the first connection resume operation associated with the first connection is triggered, but the disclosure is not limited thereto.

In one embodiment, when both of the host 202 and the first client device 300 may have been used for a while, both of the host 202 and the first client device 300 may enter the corresponding standby/idle/sleep mode. In this case, the host 202 may detect whether the host 202 is being used again. If yes, the host 202 may provide a user interface for the user to select the to-be-connected client device.

In one embodiment, if the user selects the first client device 300 as the to-be-connected client device, the first client device 300 may accordingly determine that the first connection resume operation associated with the first connection is triggered, but the disclosure is not limited thereto.

In step S316, in response to determining that the first connection resume operation associated with the first connection is triggered in the case where the first connection is disconnected, the first client device 300 at least sends the first certification information CF1 to the host 202. Next, the host 202 may certify the first client device 300 at least based on the first certification information CF1 and the first reference information in step S318.

In a first embodiment, the first client device 300 may send the first certification information CF1 to the host 202 at step S316. In this case, the host 202 may determine whether the first certification information CF1 received from the first client device 200 matches the first reference information.

In one embodiment, in response to determining that the first certification information CF1 received from the first client device 300 matches the first reference information, it means that the first client device 300 was previously connected with the host 202. In this case, the host 202 may determine that the first client device 300 is certified.

On the other hand, in response to determining that the first certification information CF1 received from the first client device 300 fails to match the first reference information, it means that the first client device 300 is was not previously connected with the host 202. In this case, the host 202 may determine that the first client device 300 is not certified.

In a second embodiment, the first client device 300 may send the first certification information CF1 and a current scenario state S2 (e.g., the current location/environment of the first client device 300) associated with the first client device 300 to the host 202 to the host 202 at step S316. In this case, the host 202 may determine whether the first certification information CF1 received from the first client device 200 matches the first reference information and whether the current scenario state S2 matches the first scenario state S1.

In one embodiment, in response to determining that the first certification information CF1 received from the first client device 300 matches the first reference information and the current scenario state S2 matches the first scenario state S1, it means that the first client device 300 was previously connected to the host 202 at the same usage scenario. In this case, the host 202 may determine that the first client device 300 is certified.

On the other hand, in response to determining that the first certification information CF1 received from the first client device 300 fails to match the first reference information and/or the current scenario state S2 fails to match the first scenario state S1, it means that the first client device 300 was not previously connected to the host 202 and/or the current usage scenario of the first client device 300 is incorrect (e.g., used at wrong locations/environments). In this case, the host 202 may determine that the first client device 300 is not certified, but the disclosure is not limited thereto.

In one embodiment, the host 202 certifies the first client device 300 at least based on the first certification information CF1 and the first reference information without performing at least a part of a standard connection resume protocol. In various embodiments, the part of the standard connection resume protocol includes at least one of a standard authentication (e.g., the step 1994 in FIG. 1), a standard encryption request (e.g., the step 1995), and providing a supported profile (e.g., the HID profile and/or the heart rate profile), but the disclosure is not limited thereto.

In step S320, in response to determining that the first client device 300 is certified, the host 202 resumes the first connection with the first client device 300.

In other embodiments where the first client device 300 is not certified, the host 202 may not resume the first connection with the first client device 300. For example, the host 202 may stay disconnected with the first client device 300, but the disclosure is not limited thereto.

Accordingly, when the first client device 300 intends to resume the first connection with the host 202, the first client device 300 does not have to re-perform (at least a part) of the connection establishment process (e.g., steps 1994-1996), but may simply send the first certification information CF1 to the host 202 for the host 202 to determine whether to resume the first connection with the first client device 300. In this case, the process for resuming the first connection may be more time efficient.

In some embodiments, after sending the first certification information CF1 to the first client device 300 via the first connection in step S314, the host 202 may update the first certification information CF1 based on the first identification information I1 and send the updated first certification information to the first client device 300 via the first connection. In the embodiment, the first reference information is updated based on the updated first certification information.

Figure 4:
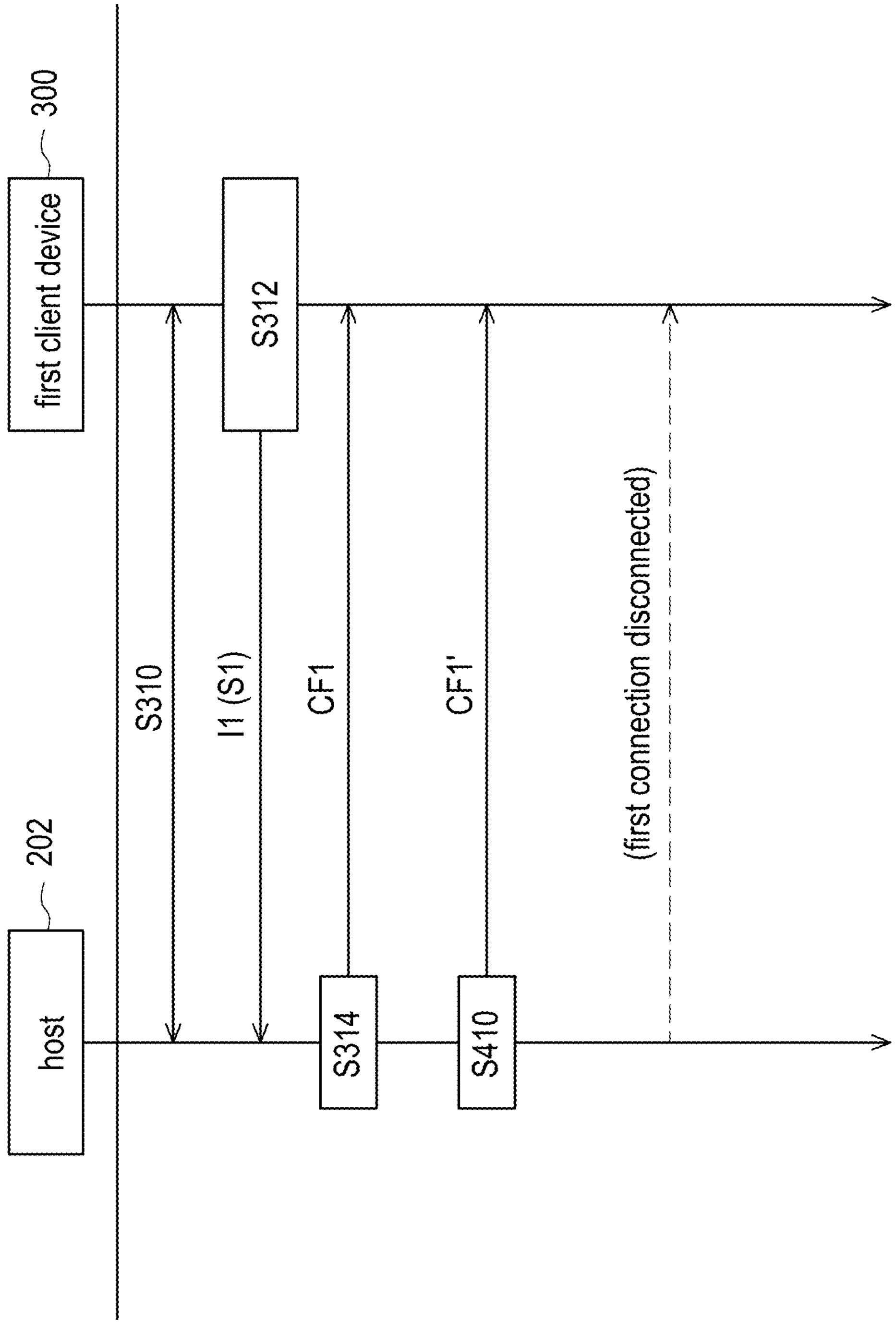
FIG. 4 shows a flow chart of the method for resuming a connection according to FIG. 3.

See FIG. 4, which shows a flow chart of the method for resuming a connection according to FIG. 3. In the embodiment, the host 202 may perform step S410 to determine the updated first certification information CF1' and send the updated first certification information CF1' to the first client device 300.

In the embodiment, the host 202 may retrieve a second text segment from the first certification information I1 as the updated first certification information CF1, such as the text segment B.

In this case, when the first client device 300 intends to resume the first connection, the first client device 300 may send the updated first certification information CF1' to the host 202 for certification, but the disclosure is not limited thereto.

In some embodiments, the host 202 may periodically update and provide updated first certification information to the first client device 300, wherein the first reference information will be accordingly updated as well. In this case, when the first client device 300 intends to resume the first connection, the first client device 300 may send the latest first certification information to the host 202 for certification, but the disclosure is not limited thereto.

How the host 202 certifies the first client device 300 based on the (updated) first certification information may be referred to the above descriptions, which would not be repeated herein.

Figure 5:
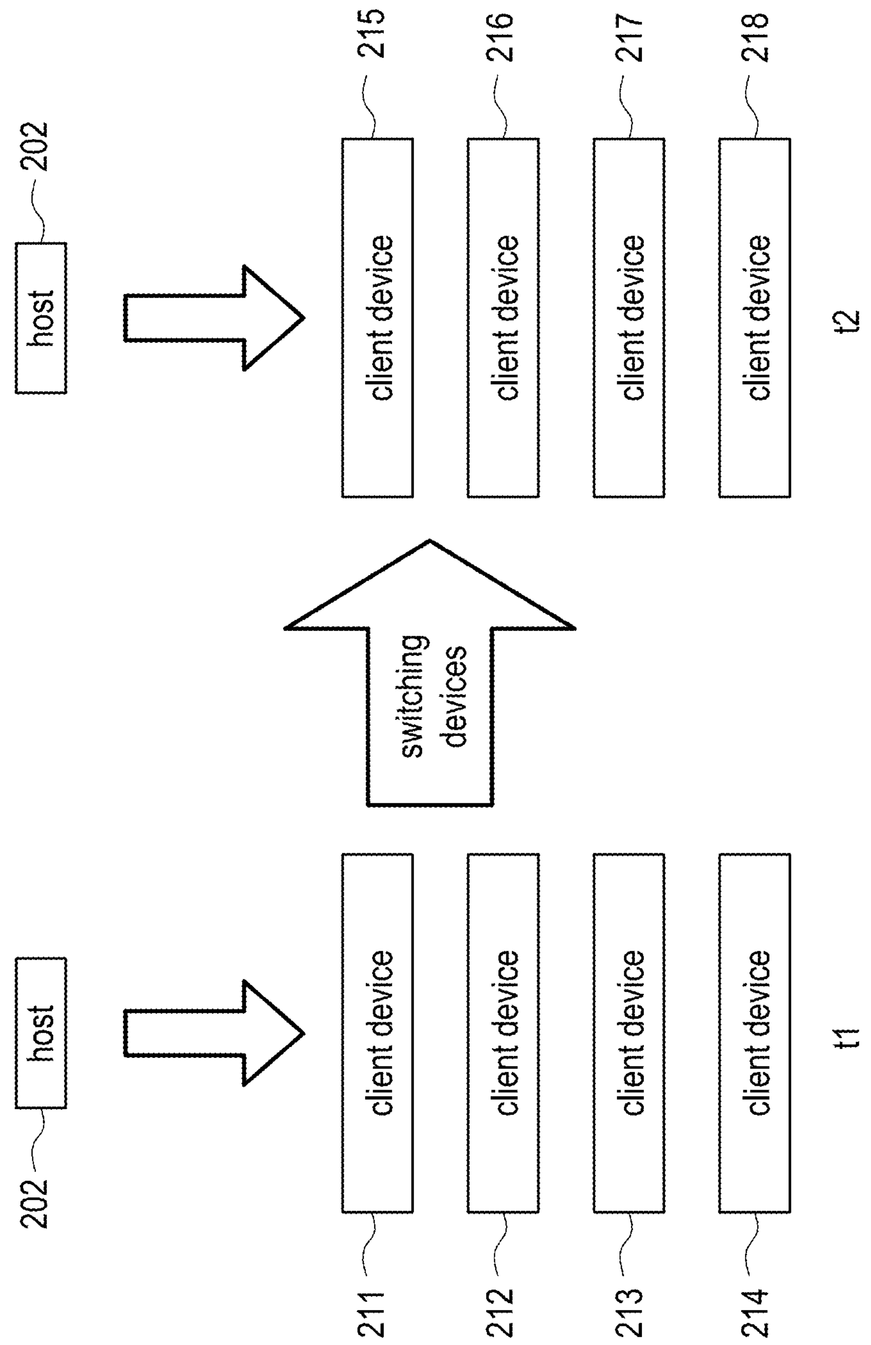
FIG. 5 shows an application scenario according to an embodiment of the disclosure.

See FIG. 5, which shows an application scenario according to an embodiment of the disclosure. In the embodiment, it is assumed that the host 202 had established the corresponding connection with each of the client devices 211-218 (e.g., N is 8) but now currently connected with the client devices 211-214 at time t1.

In one embodiment, assuming that the host 202 is switched from connecting to the client devices 211-214 to connect with the client devices 215-218 at time t2, each of the client devices 215-218 may send the corresponding certification information to the host 202 for certification.

If the client devices 215-218 have been certified, the host 202 may resume the respective connection with each of the client devices 215-218.

Since each of the client devices 215-218 does not have to re-perform (at least a part) of the connection establishment process (e.g., steps 1994-1996) with the host 202 and/or providing the supported profiles, but may simply send the corresponding certification information to the host 202 for the host 202 to determine whether to resume the corresponding connection, the process for resuming the connection may be more time efficient.

The disclosure further provides a computer readable storage medium for executing the method for method for resuming a connection. The computer readable storage medium is composed of a plurality of program instructions (for example, a setting program instruction and a deployment program instruction) embodied therein. These program instructions can be loaded into the host 202 and the first client device 300 and executed by the same to execute the method for resuming a connection and the functions of the host 202 and the first client device 300 described above.

In summary, the embodiments of the disclosure provide a solution for the host to provide the first certification information to the first client device after the host and the first client device establishes the first connection. In this case, when the first client device disconnected from the host intends to resume the first connection, the first client device may simply send the first certification information to the host for certification without re-performing the whole standard connection establishment process. Accordingly, the process for resuming the connection may be more time efficient.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. Method for resuming a connection, comprising:

establishing, by a first client device, a first connection with a host and sending, by the first client device, first identification information associated with the first client device to the host via the first connection;

determining, by the host, first certification information based on the first identification information and sending, by the host, the first certification information to the first client device via the first connection, wherein the first certification information is stored by the host as a first reference information;

in response to determining that a first connection resume operation associated with the first connection is triggered in a case where the first connection is disconnected, at least sending, by the first client device, the first certification information to the host;

certifying, by the host, the first client device at least based on the first certification information and the first reference information;

in response to determining that the first client device is certified, resuming, by the host, the first connection with the first client device;

sending, by the first client device, a first scenario state associated with the first client device to the host via the first connection, wherein the first scenario state is a first location of the first client device; and in response to determining that the first connection resume operation associated with the first connection is triggered, sending, by the first client device, a current scenario state of the first client device to the host, wherein the certifying, by the host, the first client device at least based on the first certification information and the first reference information comprises:

in response to determining that the first certification information received from the first client device matches the first reference information and the current scenario state matches the first scenario state, determining, by the host, that the first client device is certified; and in response to determining that the first certification information received from the first client device fails to match the first reference information or the current scenario state fails to match the first scenario state, determining, by the host, that the first client device is not certified.

2. The method according to claim 1, wherein determining, by the host, the first certification information based on the first identification information comprises:

retrieving, by the host, a first text segment from the first certification information as the first certification information.

3. The method according to claim 1, wherein determining, by the host, the first certification information based on the first identification information comprises:

retrieving, by the host, a first text segment from the first certification information;

converting, by the host, the first text segment into the first certification information by using a converting function.

4. The method according to claim 1, wherein certifying, by the host, the first client device at least based on the first certification information and the first reference information comprises:

in response to determining that the first certification information received from the first client device matches the first reference information, determining, by the host, that the first client device is certified; and in response to determining that the first certification information received from the first client device fails to match the first reference information, determining, by the host, that the first client device is not certified.

5. The method according to claim 1, wherein after sending, by the host, the first certification information to the first client device via the first connection, the method further comprises:

updating, by the host, the first certification information based on the first identification information; and sending, by the host, the updated first certification information to the first client device via the first connection, wherein the first reference information is updated based on the updated first certification information.

6. The method according to claim 1, wherein certifying the first client device at least based on the first certification information and the first reference information comprises:

certifying the first client device at least based on the first certification information and the first reference information without performing at least a part of a standard connection resume protocol.

7. The method according to claim 6, wherein the part of the standard connection resume protocol comprises at least one of a standard authentication, a standard encryption request, and providing a supported profile.

8. A system for resuming a connection, comprising a first client device and a host, wherein:

the first client device establishes a first connection with a host and sending first identification information associated with the first client device to the host via the first connection;

the host determines first certification information based on the first identification information and sending the first certification information to the first client device via the first connection, wherein the first certification information is stored by the host as a first reference information;

in response to determining that a first connection resume operation associated with the first connection is triggered in a case where the first connection is disconnected, the first client device at least sends the first certification information to the host;

the host certifies the first client device at least based on the first certification information and the first reference information;

in response to determining that the first client device is certified, the host resumes the first connection with the first client device;

wherein the first client device is further configured to perform:

sending a first scenario state associated with the first client device to the host via the first connection, wherein the first scenario state is a first location of the first client device;

in response to determining that the first connection resume operation associated with the first connection is triggered, sending a current scenario state of the first client device to the host;

wherein the host certifies the first client device at least based on the first certification information and the first reference information, comprises:

in response to determining that the first certification information matches the first reference information and the current scenario state matches the first scenario state, determining that the first client device is certified; and in response to determining that the first certification information fails to match the first reference information or the current scenario state fails to match the first scenario state, determining that the first client device is not certified.

9. The system according to claim 8, wherein the host is configured to perform:

retrieving a first text segment from the first certification information as the first certification information.

10. The system according to claim 8, wherein the host is configured to perform:

retrieving a first text segment from the first certification information;

converting the first text segment into the first certification information by using a converting function.

11. The system according to claim 8, wherein the host is configured to perform:

in response to determining that the first certification information received from the first client device matches the first reference information, determining that the first client device is certified; and in response to determining that the first certification information received from the first client device fails to match the first reference information, determining that the first client device is not certified.

12. The system according to claim 8, wherein after sending the first certification information to the first client device via the first connection, the host is further configured to perform:

updating the first certification information based on the first identification information; and sending the updated first certification information to the first client device via the first connection, wherein the first reference information is updated based on the updated first certification information.

13. The system according to claim 8, wherein the first client device is further configured to perform:

certifying the first client device at least based on the first certification information and the first reference information without performing at least a part of a standard connection resume protocol, wherein the part of the standard connection resume protocol comprises at least one of a standard authentication, a standard encryption request, and providing a supported profile.

14. A non-transitory computer readable storage medium, the computer readable storage medium recording an executable computer program, the executable computer program being loaded by a host and a first client device to perform steps of:

establishing, by the first client device, a first connection with the host and sending, by the first client device, first identification information associated with the first client device to the host via the first connection;

determining, by the host, first certification information based on the first identification information and sending, by the host, the first certification information to the first client device via the first connection, wherein the first certification information is stored by the host as a first reference information;

in response to determining that a first connection resume operation associated with the first connection is triggered in a case where the first connection is disconnected, at least sending, by the first client device, the first certification information to the host;

certifying, by the host, the first client device at least based on the first certification information and the first reference information;

in response to determining that the first client device is certified, resuming, by the host, the first connection with the first client device;

sending, by the first client device, a first scenario state associated with the first client device to the host via the first connection, wherein the first scenario state is a first location of the first client device; and in response to determining that the first connection resume operation associated with the first connection is triggered, sending, by the first client device, a current scenario state of the first client device to the host, wherein the certifying, by the host, the first client device at least based on the first certification information and the first reference information comprises:

in response to determining that the first certification information received from the first client device matches the first reference information and the current scenario state matches the first scenario state, determining, by the host, that the first client device is certified; and in response to determining that the first certification information received from the first client device fails to match the first reference information or the current scenario state fails to match the first scenario state, determining, by the host, that the first client device is not certified.

* * * * *